(12) United States Patent
Prasad (10) Patent No.: US 8,504,998 B2
(45) Date of Patent: Aug. 6, 2013

(54) EXTRACTING TRAINING SCENARIOS FROM TEST CASES FOR USER-INTERFACE COMPONENT RECOGNITION

(75) Inventor: Mukul R. Prasad, San Jose, CA (US)

(73) Assignee: Fujitsu Limited, Kawasaki-shi (JP)

( * ) Notice: Subject to any disclaimer, the term of this patent is extended or adjusted under 35 U.S.C. 154(b) by 571 days.

(21) Appl. No.: 12/787,979

(22) Filed: May 26, 2010

(65) Prior Publication Data

US 2011/0296314 A1  Dec. 1, 2011

(51) Int. Cl.
- *G06F 9/44* (2006.01)
- *G06F 21/00* (2006.01)
- *G06Q 30/02* (2006.01)
- *G06Q 10/00* (2006.01)

(52) U.S. Cl.
USPC ........ 717/131; 713/153; 705/14.73; 705/7.27

(58) Field of Classification Search
None
See application file for complete search history.

(56) References Cited

U.S. PATENT DOCUMENTS

| | | | | |
|---|---|---|---|---|
| 7,076,652 | B2* | 7/2006 | Ginter et al. | 713/153 |
| 7,269,433 | B2* | 9/2007 | Vargas et al. | 455/502 |
| 8,239,239 | B1* | 8/2012 | Malhotra et al. | 705/7.27 |
| 2004/0204085 | A1* | 10/2004 | Vargas et al. | 455/557 |
| 2008/0081662 | A1 | 4/2008 | Strandell et al. | 455/557 |
| 2008/0092119 | A1 | 4/2008 | Sweis | 717/124 |
| 2011/0125593 | A1* | 5/2011 | Wright et al. | 705/14.73 |

OTHER PUBLICATIONS

Non-final Office Action for U.S. Appl. No. 12/730,905 dated Apr. 19, 2012.
Response to Non-final Office Action for U.S. Appl. No. 12/730,905 dated Jul. 19, 2012.
Prasad, et al., USPTO, Final Office Action for U.S. Appl. No. 12/730,905, Sep. 7, 2012.
Prasad, et al., Response to Final Office Action for U.S. Appl. No. 12/730,905, Oct. 24, 2012.
Bolin, Michael et al., "Automation and Customization of Rendered Web Pages," *UIST '05*, Oct. 23-27, 2005.
Bolin, Michael, "End-user Programming for the Web," Massachusetts Institute of Technology, http://www.bolinfest.com/Michael_Bolin_Thesis_Chickenfoot.pdf, May 2005.

(Continued)

*Primary Examiner* — Qamrun Nahar
*Assistant Examiner* — Mohammad Kabir
(74) *Attorney, Agent, or Firm* — Baker Botts L.L.P.

(57) ABSTRACT

In one embodiment, a method includes accessing a set of use cases of a software application and selecting, from the set of use cases, a subset of use cases that has a goodness-to-cost ratio that satisfies a predetermined requirement. Computing the goodness-to-cost ratio for the subset of use cases includes: for each use case from the subset of use cases, computing a second cost as a sum of the first costs associated with the user actions of the use case; computing a third cost as a sum of the second costs; for each user-interface component that is acted upon by at least one of the user actions of at least one of the use cases from the subset of use cases, computing a first goodness measure that indicates a level of user-action coverage that the subset of use cases provides on the user-interface component; computing a second goodness measure as a sum of the first goodness measures; and computing the goodness-to-cost ratio as a ratio between the second goodness measure and the third cost.

30 Claims, 3 Drawing Sheets

(56) References Cited

OTHER PUBLICATIONS

Miller, Robert et al., "Naming Page Elements in End-User Web Automation," Workshop on End-User Software Engineering, *ICSE*, 2005.

Bolin, Michael et al., "End-User Programming for the Web," http://groups.csail.mit.edu/uid/projects/chickenfoot/ accessed Mar. 24, 2010.

"Selenium Documentation," http://seleniumhq.org/docs, Mar. 5, 2010.

U.S. Appl. No. 12/787,979, May 26, 2010.

Advisory Action for U.S. Appl. No. 12/730,905 dated Nov. 2, 2012.

Request for Continued Examination Transmittal for U.S. Appl. No. 12/730,905 dated Dec. 7, 2012.

\* cited by examiner

EXTRACTING TRAINING SCENARIOS FROM TEST CASES FOR USER-INTERFACE COMPONENT RECOGNITION

TECHNICAL FIELD

This disclosure relates to user-interactive software applications.

BACKGROUND

There are multiple types of software applications, one of which is user-interactive software applications. A user-interactive software application may be either a desktop-based application that may be executed on a standalone computing system or a network-based application that may be executed on a client or a server within a client-server environment. With a user-interactive software application, typically, there are one or more displayable views that may be displayed to a user of the application one view at a time on, for example, the display screen of the computing system or client device on which the application is executed. These displayable views are the output of the application, and together, they provide a user interface for the application. In some cases, a particular displayable view may include one or more user-interface components, such as panels, frames, pull-down menus, pop-up menus, buttons, check boxes, selection lists, or text fields, that enable a user of the application to provide input to the application. The application may accept various types of input from the user in connection with specific views that are currently displayed to the user through, for example, a human-input device such as a mouse, a keyboard, or a joystick. The user may provide different types of input through different user-interface components contained in different views of the application.

DESCRIPTION OF EXAMPLE EMBODIMENTS

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A user-interactive software application may include a user interface through which a user of the application may interact with the application. In particular embodiments, the user interface of the application may include any number (e.g., one or more) displayable views. In particular embodiments, a particular view may enable a user of the application to provide input to the application, or may be used to display output of the application to the user, or both. In particular embodiments, a view may include one or more user-interface components, such as, for example and without limitation, windows, panels, frames, pull-down menus, pop-up menus, clickable links, buttons, check boxes, selection lists, or text fields. The user may provide input to the application through specific user-interface components contained in specific views. Similarly, the application may display its output to the user using specific user-interface components contained in specific views. A user-interface component may also be referred to as a user-interface artifact or a widget. A web application is a common example of a user-interactive software application. In general, a web application may include one or more web pages, and each web page may be considered a displayable view of the web application. Each web page may include any number of user-interface components or widgets, such as, for example and without limitation, frames, clickable links, text fields, buttons, check boxes, or selection lists. A user of the web application may interact with the web application through specific user-interface components or widgets contained in specific web pages.

Figures 1, 2, 3:
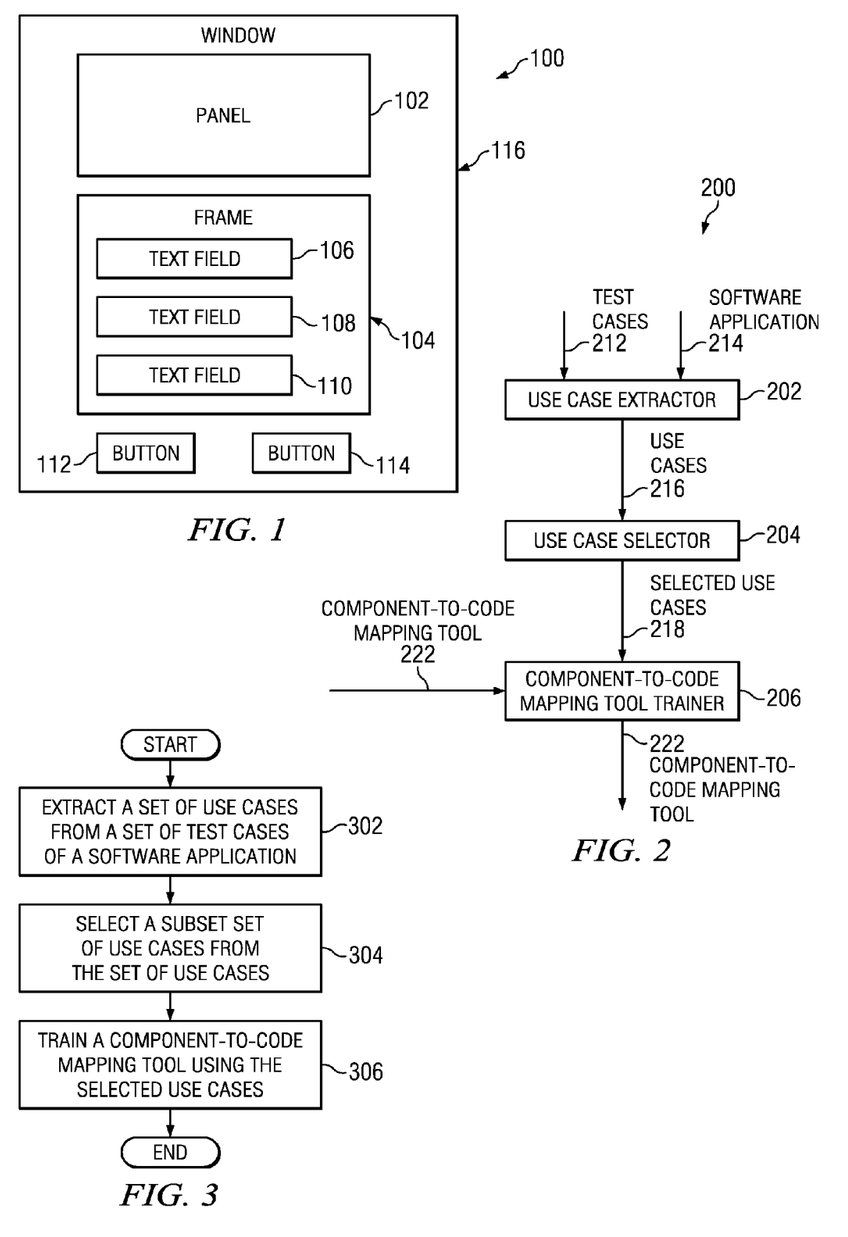
FIG. 1 illustrates an example view of a user interface of a software application.
FIG. 2 illustrates an example system for training a component-to-code mapping tool.
FIG. 3 illustrates an example method for training a component-to-code mapping tool.

In particular embodiments, the user-interface components contained in a particular view of the user interface of the software application may be organized into a hierarchy. FIG. 1 illustrates an example view 100 of a user interface of a software application. View 100 may include various types of user-interface components organized into a hierarchy. For example, at the top level of the hierarchy, there is a window 116. Window 116 may contain a panel 102, a frame 104, and two buttons 112 and 114, which may form the second level of the hierarchy. Frame 104 may further contain three text fields 106, 108, and 110, which may form the third level of the hierarchy.

In particular embodiments, the programming code implementing the software application may include specific portions that implement the user interface of the application. In particular embodiments, each user-interface component may have its associated portions of the code that implement the functionalities of the user-interface component. In particular embodiments, a tool, implemented as computer software or hardware or a combination thereof, may be trained to automatically map a user-interface component to its associated code (i.e., the specific code that implements the functionalities of the user-interface component). More specifically, in particular embodiments, given a displayable view of a user interface of a software application, which may contain any number of user-interface components of various types, the component-to-code mapping tool may analyze the view to identify the individual user-interface components contained therein, and automatically map specific user-interface components to the specific portions of the code of the software application that implement the functionalities of those user-interface components.

In particular embodiments, a component-to-code mapping tool may need to be trained before it is able to correctly identify user-interface components of software applications and map individual user-interface components to their respectively associated code. In particular embodiments, the component-to-code mapping tool may be trained using one or more sets of use cases respectively associated with one or more software applications. Particular embodiments may select, from a set of use cases associated with a software application, a subset of use cases that has a goodness-to-cost ratio that satisfies a predetermined threshold requirement and train a component-to-code mapping tool using the subset of use cases.

FIG. 2 illustrates an example system 200 for training a component-to-code mapping tool. In particular embodiments, the components of system 200 illustrated in FIG. 2 may each be implemented as computer software or hardware or a combination thereof. FIG. 3 illustrates an example method for training a component-to-code mapping tool. FIGS. 2 and 3 are described in connection with each other. Furthermore, although FIG. 2 is described in connection with one software application and one set of use cases associated with the software application, the steps illustrated in FIG. 2 may be repeated in connection with multiple software applications and multiple sets of use cases associated with these software applications. A component-to-mapping tool may be repeatedly trained using multiple sets of use cases in order to, for example, improve its performance quality.

In particular embodiments, a software application may be associated with a set of test cases. These test cases may be constructed or obtained by any suitable means. For example, the test cases may be designed and constructed based on the specification of the software application, or as a part of the development and implementation process for the software application since all software applications should be tested and validated before they are ready to be deployed. In particular embodiments, each test case may include a use case and a description or definition of the specific test to be performed in connection with the use case. In particular embodiments, a use case included in a test case may specify a sequence of actions that may be performed in connection with the software application. For example, the sequence of actions may be a sequence of user actions that may be performed by a user of the application in connection with or upon specific user-interface components of the software application (e.g., clicking a button or a link, typing words in a text field, checking a box, or selecting a menu item), and performing the user actions may provide various input to the application. The sequence of actions may reflect how the software application should be used in practice. For example, a sequence of actions that may be performed in connection with a web application may include: (1) type a username in the "username" field; (2) type a password in the "password" field; (3) click the "login" button; (4) click the "add to shopping cart" button associated with a MP3 player; (5) click the "check out" button; and (6) type a credit number in the "credit card number" field. In particular embodiments, the test description included in a test case may specify any information relating to the test, such as, for example and without limitation, how the sequence of actions included in the use case of the test case are to be applied as test input to the software application, the runtime environment in which the test is to be performed on the software application, the specific test to be performed using the corresponding use case, the coverage of the test, the specific types of errors verified, the correct output or behavior of the software application (i.e., the expected test result), and so on.

Particular embodiments may extract a set of use cases from a set of test cases associated with a software application, as illustrated in step 302 of FIG. 3. In particular embodiments, step 302 may be performed by component 202 of system 200 illustrated in FIG. 2. In particular embodiments, component 202 may take as input a user-interactive software application 214 and a set of test cases 212 associated with software application 214. Component 202 may parse each test case 212 to extract the use case included in that text case 212 and construct a set of use cases 216 that contains the use cases extracted from the individual test cases 212. Component 202 may provide as output use cases 216 extracted from test cases 212.

In particular embodiments, each use case may include a sequence of actions, such as actions that may be performed by a user with respect to the software application, and there may be any number of actions included in a particular use case. In particular embodiments, each action may be represented using a three-tuple in the form of "<action, type, name>" or a four-tuple in the form of "<action, type, name, value>". In particular embodiments, "action" and "type" may be defined based on the programming language used to implement the software application with which the use case is associated. For example, "action" may be used to specify the specific actions performed in connection with the user-interface components of the software application (e.g., action∈{click, assign, mouse-over}), and "type" may be used to specify the specific user-interface components of the software application upon which the actions are performed (e.g., type∈{link, button, input-box}). In particular embodiments, "name" may be an arbitrary string designated by a user or a developer of the software application. For example, "name" may be used to indicate the names of the user-interface components upon which the actions are performed. In particular embodiments, "value" may be the actual values (e.g., string value) applied by a user in connection with specific actions.

For example, an action of clicking a "submit" button may be represented using a three-tuple as "<click, button, "submit">". An action of inputting a value "2" in a "quantity" input field may be represented using a four-tuple as "<assign, input-box, "quantity", 2>". The following illustrates an example use case where each action in the use case is represented using a three-tuple or a four-tuple:

--- click button "kindle"
assign input-box srcbox "Perfumes"
click button "go"
click link "davidoff"
click button "addtocart"
click button "proceed"
click link "forget-password"
click button "cart"
assign input-box qty "2"
click button "update"

---

Example Use Case

Given a set of use cases associated with a software application (e.g., a set of use cases extracted from a set of test cases associated with the software application), particular embodiments may select from the set of use cases a subset of use cases, as illustrated in step 304 of FIG. 3. In particular embodiments, the subset of use cases thus selected may be an optimal subset of use cases for the purpose of training a component-to-code mapping tool. In particular embodiments, step 304 may be performed by component 204 of system 200 illustrated in FIG. 2. In particular embodiments, component 204 may take as input a set of use cases 216 and provide as output a subset, and more specifically, an optimal subset of use cases 218 select from use case 216. Particular embodiments may consider an optimal subset of use cases for the purpose of training a component-to-code mapping tool to have certain desirable characteristics. For example, particular embodiments may select a subset of use cases by minimizing the cost and the size of the subset while maximizing the component coverage of the subset.

In particular embodiments, a set of use cases associated with a software application may include any number of use cases (e.g., one or more use cases), and each use case may include a sequence of actions that has any number of actions (e.g., one or more actions). Let $U=\{u_1, u_2, \ldots, u_{n_U}\}$ denote a set of $n_U$ use cases, where $n_U \geq 1$ and each $u_i \in U$ denoting a particular use case from U. In particular embodiments, U is the set of use cases from which an optimal subset of use cases may be selected for the purpose of training a component-to-mapping tool. Let $U^s=\{u_1, u_2, \ldots, u_{n_{U^s}}\}$ denote a subset of $n_{U^s}$ use cases selected from U (i.e., $U^s \subset U$ and $1 \leq n_{U^s} \leq n_U$). In addition, in particular embodiments, as each use case includes a sequence of actions, let $u=\langle a_1, a_2, \ldots, a_{n_a}\rangle$ denote a sequence of $n_a$ actions included in a particular use case, u, where $n_a \geq 1$ and each $a_i \in u$ denoting a particular action from u. In particular embodiments, a sequence of actions may be performed in the same order as they are specified. For example, given a sequence of action $\langle a_1, a_2, \ldots, a_{n_a}\rangle$, $a_1$ is performed first, followed by $a_2$ that is performed second, followed by $a_3$ that is performed third, and so on. Furthermore, each action $a_i$ may be performed in connection with a particular user-interface component (i.e., a widget) of the software application with which the set of use cases (e.g., U) is associated (i.e., each action may acts upon a particular user-interface component), and within each sequence of actions, the individual actions may be performed in connection with the same or different user-interface components.

In particular embodiments, there may be a cost associated with performing each action included in each use case. In particular embodiments, the cost associated with an action may represent the cost for a human user to perform the action in terms of, for example and without limitation, time, computer resources, and wages for the human user. Thus, the cost associated with an action may be a non-negative number. Particular embodiments may determine the cost for each action based on experiments or empirical data or may select a default cost (e.g., 1) for each action. In particular embodiments, each action included in a use case may be represented using another four-tuple that takes into consideration the cost associated with performing the action, in the form of "$a=\langle w, i, d, c\rangle$", where (1) w represents a user-interface component (i.e., a widget), such as a login button, a clickable link, or a text field, in connection with which the action is performed; (2) i represents the specific user action performed on w, such as click, mouse over, or type text; (3) d represents a string denoting the data associated with the action, which may be an empty string, such as a string representing a username or a password entered in text fields; and (4) c represents the cost associated with performing the action, which may be greater than or equal to 0 (i.e., a non-negative number, such as 1).

In particular embodiments, there may be a cost associated with performing each use case. In particular embodiments, the cost associated with a use case may represent the cost for a human user to perform the entire sequence of actions included in the use case. In particular embodiments, the cost associated with a use case may be the sum of the individual costs associated with the individual actions included in that use case. If $C(a_i)$ denotes the cost associated with an action, $a_i$, and $a_i$ is included in a use case, u (i.e., $a_i \in u$), then in particular embodiments, the cost associated with u may be defined as $$C(u) = \sum_{a_i \in u} C(a_i).$$

Similarly, in particular embodiments, the cost associated with a set of use cases (e.g., U or $U^s$) may be the sum of the individual costs associated with the individual use cases from the set; that is $$C(U) = \sum_{u_i \in U} C(u_i) \text{ and } C(U^s) = \sum_{u_i \in U^s} C(u_i).$$

When selecting a subset of use cases, $U^s$, for the purpose of training a component-to-mapping tool, particular embodiments may attempt to minimize $C(U^s)$.

In particular embodiments, a user-interface component (i.e., a widget) is considered to be exercised or covered by a use case if the use case includes at least one action that is performed in connection with that user-interface component (e.g., at least one action that acts upon the user-interface component). Given a user-interface component covered by a use case, the action that acts upon the user-interface component may be any action along the sequence of actions included in the use case. When selecting a subset of use cases, $U^s$, for the purpose of training a component-to-mapping tool, particular embodiments may attempt to maximize the number of user-interface components covered by the use cases included in the subset (i.e., maximizing the user-interface-component coverage of the subset). In addition, particular embodiments may attempt to increase the diversity of the actions that are performed in connection with the user-interface components. For example, given a user-interface component, particular embodiments may attempt to select different sequences of actions included in different use cases that lead up to the specific actions being performed in connection with the user-interface component so that the user-interface component may be exercised within different scenarios. Similarly, particular embodiments may attempt to select different use cases that include different types of actions being performed in connection with the user-interface component.

In particular embodiments, given a pair of use cases, $u_1$ and $u_2$, and a user-interface component, w, such that w is exercised in both $u_1$ and $u_2$ (i.e., there is at least one action in $u_1$ and at least one action in $u_2$ that are performed in connection with w), $u_1$ may be defined as $u_1 = \langle a_1^1, a_2^1, \ldots, a_m^1\rangle$ and $\exists a_{i_1}^1$: $a_{i_1}^1 \in u_1, W(a_{i_1}^1)=w$, and $u_2$ may be defined as $u_2 = \langle a_1^2, a_2^2, \ldots, a_n^2\rangle$ and $\exists a_{i_2}^2: a_{i_2}^2 \in u_2, W(a_{i_2}^2)=w$. In particular embodiments, a distance between $u_1$ and $u_2$ with respect to w, denoted as $D_w(u_1, u_2)$, may be defined as $$D_w(u_1, u_2) = \sum_{j=1}^{max(i_1, i_2)} x_j, \text{ where } x_j = 1_{\textit{iff}} \ a_j^1 \neq a_j^2 \text{ and } x_j = 0$$

otherwise. Essentially, $D_w(u_1, u_2)$ represents the number of actions in which the two sequences of actions included in $u_1$ and $u_2$ respectively differ up to the point where w is exercised. In particular embodiments, if there are multiple actions included in $u_1$ or $u_2$ that act upon w, then $a_{i_1}^1$ is the earliest action in the sequence of $u_1$ that acts upon w, and $a_{i_2}^2$ is the earliest action in the sequence of $u_2$ that acts upon w.

In particular embodiments, given a set of use cases, U or $U^s$, and a user-interface components w, the distance for the set of use cases with respect to the user-interface component may be the sum of the pair-wise distances for all unique pairs of use cases in the set. Thus, the distance for U with respect to w may be defined as $$D_w(U) = \sum_{\forall u_i, u_j \in U} D_w(u_i, u_j),$$

and the distance for $U^s$ with respect to w may be defined as $$D_w(U^s) = \sum_{\forall u_i, u_j \in U^s} D_w(u_i, u_j).$$

When selecting a subset of use cases, $U^s$, from a set of use cases, U, associated with a software application for the purpose of training a component-to-mapping tool, particular embodiments may determine a goodness measure, $G(U^s)$, for $U^s$, which represents the coverage $U^s$ provides on the user-interface components of the software application. That is, $G(U^s)$ may indicate how many user-interface components are acted upon by the actions included in the use cases from $U^s$, as well as the different types of actions that act upon the user-interface components and the scenarios within which the user-interface components are act upon. Particular embodiments may attempt to maximize the goodness measure of the subset of use case, $U^s$, selected from the set of use cases, U. In particular embodiments, the goodness measure for the subset of use cases with respect to all the user-interface components covered by the subset of use cases may be the sum of the goodness measures with respect to the individual user-interface components covered by the subset of use cases. Let $G_w(U^s)$ denote the goodness measure of $U^s$ with respect to a particular user-interface component, w, covered by the use cases from $U^s$. In particular embodiments, with respect to all the user-interface components covered by the use cases from $U^s$, the goodness measure, $G(U^s)$, may be defined as $$G(U^s) = \sum_{\forall w \subset U^s} G_w(U^s).$$

In particular embodiments, $G_w(U^s)$ may be defined as $G_w(U^s) = C_x \times (C_a \times f_w^{U^s/U}) \times (C_d \times D_w(U^s))$, where (1) $f_w^{U^s/U}$ represents the fraction of actions in connection with w represented in $U^s$ versus in U; and (2) $C_x$, $C_a$, and $C_d$ are the multiplicative costs to relatively weigh the benefit of covering a user-interface component (e.g., w), covering more actions, and covering with diverse scenarios, respectively. More specifically, given a user-interface component, w, $f_w^{U^s/U}$ represents the ratio between the number of actions included in the use cases from $U^s$ performed in connection with w and the number of actions included in the use cases from U performed in connection with w; that is, $$f_w^{U^s/U} = \frac{f_w^{U^s}}{f_w^U}.$$

$C_x$ represents the multiplicative cost to relatively weight each user-interface component in terms of the relative importance in covering one specific user-interface component versus covering another specific user-interface component of the software application. $C_a$ represents the multiplicative cost in terms of the importance in covering as many different actions as possible for the individual user-interface components, where different actions may be performed in connection with different user-interface components. $C_d$ represents the multiplicative cost in terms of the importance in covering the user-interface components with diverse scenarios, such as different sequences of actions. The values of $C_x$, $C_a$, and $C_d$ may be determined based on experiments or empirical data or assigned default values.

In particular embodiments, given a subset of use cases, $U^s$, its goodness-to-cost ratio may be defined as $$R(U^s) = \frac{G(U^s)}{C(U^s)}.$$

Particular embodiments may consider $U^s$ to be optimal if: (1) $U^s$ covers all or most of the user-interface components as covered by U; (2) $U^s$ covers all or most of the different actions performed on the user-interface components as covered by U; (3) $U^s$ covers all or most of the different scenarios within which the user-interface components are exercised as covered by U; and (4) the cost of performing $U^s$ is relatively minimized. To achieve these objectives, when selecting a subset of use cases, $U^s$, from a set of use cases, U, for the purpose of training a component-to-mapping tool, particular embodiments may attempt to maximum $G(U^s)$ as well as minimize $C(U^s)$; that is, to maximum the value of $R(U^s)$. Therefore, in particular embodiments, given a set of use cases, an optimal subset of use cases selected from the set of use cases may be the subset that has the highest or a relatively high goodness-to-cost ratio among all possible subsets of use case that may be resulted from the set of use cases.

Given any set of use cases, U, one way to find from U the subset of use cases, $U^s$, that has the maximum value of $R(U^s)$ among all possible subsets of U may be to compute the value of $R(U^s)$ for each and every possible subset of U, and then select the subset that has the maximum value of $R(U^s)$. This may be done using a branch-and-bound algorithm. In this case, the subset of use cases thus selected has the highest goodness-to-cost ratio, $R(U^s)$, among all possible subsets of U.

However, if the number of use cases in U is relatively large, then there may be a very large number of possible subsets of U. In this case, it may take a great amount of resources (e.g., in terms of time and computer resources) to verify the value of $R(U^s)$ for each and every possible subset of U, which may not always be practical in real-world applications. In fact, given any set of use cases, U, depending on the size or complexity of U, sometimes, selecting from U the optimal subset of use cases, $U^s$ (i.e., the subset of U that has the highest value of $R(U^s)$ among all possible subsets of U), may have NP-complete computational complexity. In such cases, in practice, it may not be possible or it may be very difficult to find an exactly optimal subset of use cases from U.

Instead, particular embodiments may use a greedy algorithm to approximate an optimal subset of use cases. Given a set of use cases, U, first, particular embodiments may select from U those use cases that each uniquely cover a user-interface component or include a component-action combination, and include these use cases in the subset, $U^s$. That is, each selected use case is the only use case from U that covers a particular user-interface component or includes a particular component-action combination. Next, particular embodiments may examine the remaining use cases from U one use case at a time. Particular embodiments may select the one remaining use case from U that, if added to $U^s$, causes $R(U^s)$ to increase the most (i.e., maximally increases the value of $R(U^s)$), and add this use case to $U^s$. Particular embodiments may repeat this step (i.e., selecting the one remaining use case from U that, if added to $U^s$, causes $R(U^s)$ to increase the most and add this use case to $U^s$), until no use case remains in U that, if added to $U^s$, causes $R(U^s)$ to increase further. At this point, particular embodiments may consider $U^s$ a sufficient approximation of the optimal subset of use cases that may be selected from U. Consequently, particular embodiments may need to compute $R(U^s)$ each time another use case is added to $U^s$ using the equations provided above.

Alternatively, particular embodiments may approximate an optimal subset of use cases using Simulated Annealing. Briefly, with the Simulated Annealing algorithm, particular embodiments may begin with a seed subset of use cases selected from U and iteratively attempt to improve the value of $R(U^s)$ using heuristics, until the subset of use cases has an acceptable $R(U^s)$. At this point, particular embodiments may consider $U^s$ a sufficient approximation of the optimal subset of use cases that may be selected from U.

When approximating an optimal subset of use cases selected from a set of use cases, particular embodiments may compare the value of $R(U^s)$ for the subset, $U^s$, to a predetermined threshold or some other type of requirement. If the value of $R(U^s)$ for $U^s$ satisfies this predetermined requirement, then particular embodiments may consider $U^s$ to be sufficiently optimal for the purpose of training a component-to-code mapping tool.

In particular embodiments, the subset of use cases, $U^s$, thus selected may be used to train a component-to-code mapping tool, as illustrated in step 306 of FIG. 3. In particular embodiments, step 306 may be performed by component 206 of system 200 illustrated in FIG. 2. In particular embodiments, component 206 may take as input a subset of use cases 218 and a component-to-code mapping tool 222, train component-to-code mapping tool 222 using selected use cases 218, and provide as output component-to-code mapping tool 222 after it has been trained.

In particular embodiments, a trained component-to-code mapping tool may be used to map user-interface components of a web application to their corresponding code. In particular embodiments, a web application may include any number of web pages, and each web page may include any number of user-interface components (e.g., panels, frames, text fields, buttons, check boxes, or menu lists). Each web page may be represented using Document Object Model (DOM) as a hierarchical DOM structure or DOM tree. In this case, each user-interface components contained in the web page may be represented as a DOM sub-tree that includes a set of one or more DOM elements. In particular embodiments, the DOM sub-tree may include a root DOM node and one or more child DOM nodes. In some cases, the root DOM node or one or more of the child DOM nodes of the sub-tree root node may include an event handler for the corresponding user-interface component. The component-to-code mapping tool may analyze the DOM structure the determine the individual DOM sub-tress representing the specific user-interface components and then map the user-interface components to their corresponding code.

Figure 4:
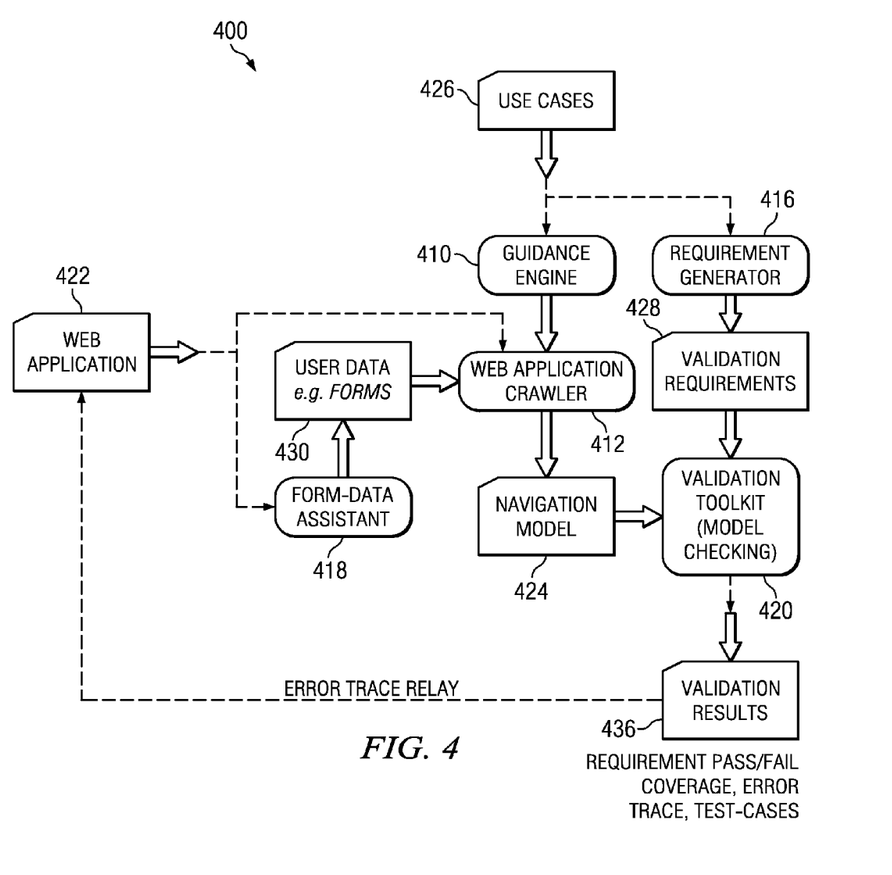
FIG. 4 illustrates an example test environment in which a component-to-code mapping tool may be utilized.

A component-t-code mapping tool, thus trained, may be used in many practical applications. For example, FIG. 4 illustrates a test environment 400 in which a software application may be tested and formally validated. In particular embodiments, test environment 400 may include a guidance engine 410, a web crawler 412, a requirement generator 416, a form-data assistant 418, and a validation toolkit 420. The components of test environment 400 may each be implemented as hardware, software, or a combination thereof. In particular embodiments, the process illustrated in FIG. 2 may a part of form-data assistant 418, which automatically generates user-input data 430 for a web application 422.

In particular embodiments, with the aid of guidance engine 410, web application crawler 412 may access and crawl web application 422 and output a navigation model 424 for web application 422. In particular embodiments, requirement generator 416 may generate implementation-level validation requirements 428 based at least in part on user-level validation requirements 426 (e.g., use cases). In particular embodiments, validation requirements 428 may be applied as input to validation toolkit 420, and validation toolkit 420 may validate web application 422 using navigation model 424 in conjunction with validation requirements 428 and output validation results 434. In particular embodiments, a component-to-code mapping tool may be a part of requirement generator 416 and may be used to identify the user-interface components of a software application being tested (e.g., web application 422) and map these user-interface components to their associated code that implements the functionalities of the user-interface components.

Figure 5:
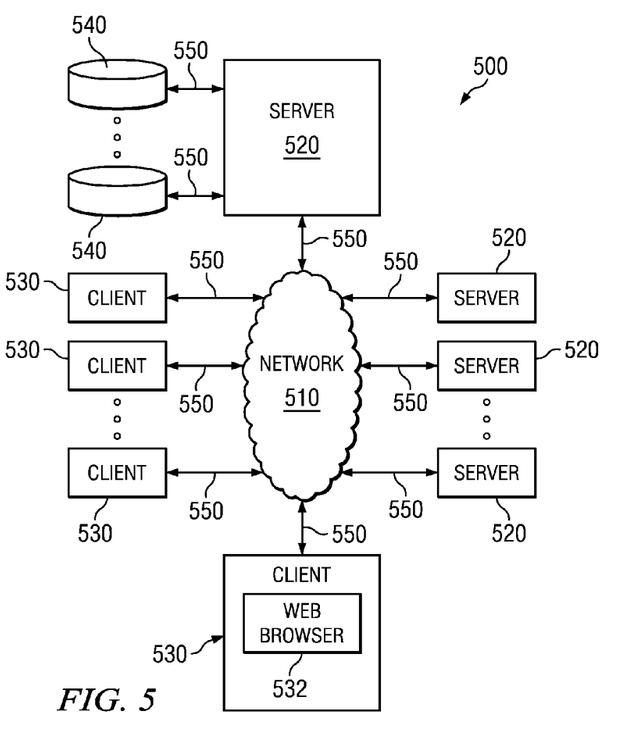
FIG. 5 illustrates an example network environment.

Particular embodiments may be implemented in a network environment. FIG. 5 illustrates an example network environment 500 suitable for providing software validation as a service. Network environment 500 includes a network 510 coupling one or more servers 520 and one or more clients 530 to each other. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. This disclosure contemplates any suitable network 510.

One or more links 550 couple a server 520 or a client 530 to network 510. In particular embodiments, one or more links 550 each includes one or more wireline, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. This disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more severs 520 via one or more links 550. In particular embodiments, data storages 540 may be used to store various types of information. In particular embodiments, the information stored in data storages 540 may be organized according to specific data structures. In particular embodiments, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functionalities implemented or supported by client 530. For example and without limitation, a client 530 may be a desktop computer system, a notebook computer system, a netbook computer system, a handheld electronic device, or a mobile telephone. This disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
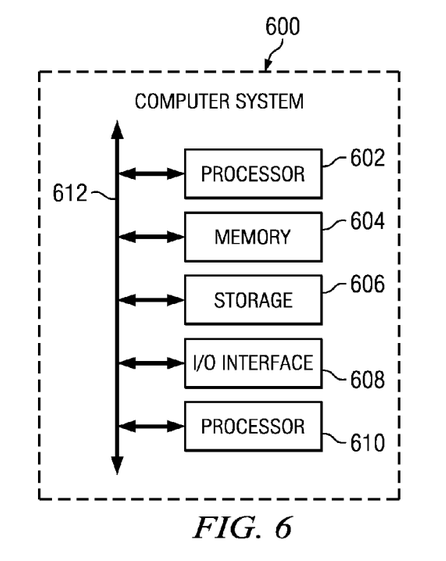
FIG. 6 illustrates an example computer system.

Particular embodiments may be implemented on one or more computer systems. FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602.

Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising, by one or more computing devices:
    accessing a set of use cases of a software application, wherein:
        the software application comprises one or more user-interface components that enable a user of the software application to interact with the software application;
        each use case from the set of use cases comprises one or more user actions that act upon specific ones of the user-interface components; and
        each one of the user actions is associated with a first cost for performing the user action; and
    selecting, from the set of use cases, a subset of use cases that has a goodness-to-cost ratio that satisfies a predetermined requirement, wherein computing the goodness-to-cost ratio for the subset of use cases comprises:
        for each use case from the subset of use cases, computing a second cost as a sum of the first costs associated with the user actions of the use case;
        computing a third cost as a sum of the second costs;
        for each user-interface component that is acted upon by at least one of the user actions of at least one of the use cases from the subset of use cases, computing a first goodness measure that indicates a level of user-action coverage that the subset of use cases provides on the user-interface component;
        computing a second goodness measure as a sum of the first goodness measures; and
        computing the goodness-to-cost ratio as a ratio between the second goodness measure and the third cost.

2. The method of claim 1, wherein the subset of use cases has the highest goodness-to-cost ratio among all possible subsets of use cases selected from the set of use case.

3. The method of claim 1, wherein for each user-interface component that is acted upon by at least one of the user actions of at least one of the use cases from the subset of use cases, computing the first goodness measure comprises:
    for each unique pair of use cases from the subset of use cases, computing a first distance between the pair of use cases with respect to the user-interface component, wherein the first distance indicates a difference between the user actions of the pair of use cases up to the user actions that act upon the user-interface component;
    computing a second distance as a sum of the first distances; and
    computing the first goodness measure based on the second distance.

4. The method of claim 1, wherein selecting, from the set of use cases, the subset of use cases comprises:
    selecting, from the set of use cases, all use cases that are the only use cases among the set of use cases to comprise user actions that uniquely act upon at least one of the user-interface components or to comprise at least one unique combination of user action and user-interface component;
    including the selected use cases in the subset of use cases;
    computing the goodness-to-cost ratio of the subset of use cases based on the use cases currently included in the subset of use cases;
    iteratively selecting, from one or more remaining use cases from the set of use cases, a use case that maximally increases the goodness-to-cost ratio of the subset of use cases and including the selected use case in the subset of use cases, until including additional use cases in the subset of use cases no longer increases the goodness-to-cost ratio of the subset of use cases.

5. The method of claim 1, wherein selecting, from the set of use cases, the subset of use cases comprises iterating among all possible subsets of the set of use cases using a branch-and-bound algorithm to locate the one subset of use cases that has the highest goodness-to-cost ratio.

6. The method of claim 1, further comprising training a user-interface-component-mapping tool using the subset of use cases, wherein the user-interface-component-mapping tool automatically maps a second user-interface component of a second user-interactive software application to a portion of source code of the second software application.

7. The method of claim 1, further comprising extracting the set of use cases from a set of test cases of the software application.

8. The method of claim 1, wherein the level of user-action coverage is based on whether the user-interface component is exercised by the subset of use-cases.

9. The method of claim 1, wherein selecting the subset of use cases comprises selecting a plurality of use cases that maximizes a number of user-interface components exercised by at least one action when the subset of uses cases is performed.

10. A system comprising:
a memory comprising instructions executable by one or more processors; and
one or more processors coupled to the memory and operable to execute the instructions, the one or more processors being operable when executing the instructions to:
access a set of use cases of a software application, wherein:
the software application comprises one or more user-interface components that enable a user of the software application to interact with the software application;
each use case from the set of use cases comprises one or more user actions that act upon specific ones of the user-interface components; and
each one of the user actions is associated with a first cost for performing the user action; and
select, from the set of use cases, a subset of use cases that has a goodness-to-cost ratio that satisfies a predetermined requirement, wherein computing the goodness-to-cost ratio for the subset of use cases comprises:
for each use case from the subset of use cases, compute a second cost as a sum of the first costs associated with the user actions of the use case;
compute a third cost as a sum of the second costs;
for each user-interface component that is acted upon by at least one of the user actions of at least one of the use cases from the subset of use cases, compute a first goodness measure that indicates a level of user-action coverage that the subset of use cases provides on the user-interface component;
compute a second goodness measure as a sum of the first goodness measures; and
compute the goodness-to-cost ratio as a ratio between the second goodness measure and the third cost.

11. The system of claim 10, wherein the subset of use cases has the highest goodness-to-cost ratio among all possible subsets of use cases selected from the set of use case.

12. The system of claim 10, wherein for each user-interface component that is acted upon by at least one of the user actions of at least one of the use cases from the subset of use cases, compute the first goodness measure comprises:
for each unique pair of use cases from the subset of use cases, compute a first distance between the pair of use cases with respect to the user-interface component, wherein the first distance indicates a difference between the user actions of the pair of use cases up to the user actions that act upon the user-interface component;
compute a second distance as a sum of the first distances; and
compute the first goodness measure based on the second distance.

13. The system of claim 10, wherein select, from the set of use cases, the subset of use cases comprises:
select, from the set of use cases, all use cases that are the only use cases among the set of use cases to comprise user actions that uniquely act upon at least one of the user-interface components or to comprise at least one unique combination of user action and user-interface component;
include the selected use cases in the subset of use cases;
compute the goodness-to-cost ratio of the subset of use cases based on the use cases currently included in the subset of use cases;
iteratively select, from one or more remaining use cases from the set of use cases, a use case that maximally increases the goodness-to-cost ratio of the subset of use cases and include the selected use case in the subset of use cases, until including additional use cases in the subset of use cases no longer increases the goodness-to-cost ratio of the subset of use cases.

14. The system of claim 10, wherein select, from the set of use cases, the subset of use cases comprises iterate among all possible subsets of the set of use cases using a branch-and-bound algorithm to locate the one subset of use cases that has the highest goodness-to-cost ratio.

15. The system of claim 10, wherein the one or more processors are further operable when executing the instructions to train a user-interface-component-mapping tool using the subset of use cases, wherein the user-interface-component-mapping tool automatically maps a second user-interface component of a second user-interactive software application to a portion of source code of the second software application.

16. The system of claim 10, wherein the one or more processors are further operable when executing the instructions to extract the set of use cases from a set of test cases of the software application.

17. The system of claim 10, wherein the level of user-action coverage is based on whether the user-interface component is exercised by the subset of use-cases.

18. The system of claim 10, wherein the one or more processors is operable to select the subset of use cases by selecting a plurality of use cases that maximizes a number of user-interface components exercised by at least one action when the subset of uses cases is performed.

19. One or more computer-readable non-transitory storage media embodying software operable when executed by one or more computing devices to:
access a set of use cases of a software application, wherein:
the software application comprises one or more user-interface components that enable a user of the software application to interact with the software application;
each use case from the set of use cases comprises one or more user actions that act upon specific ones of the user-interface components; and
each one of the user actions is associated with a first cost for performing the user action; and
select, from the set of use cases, a subset of use cases that has a goodness-to-cost ratio that satisfies a predetermined requirement, wherein computing the goodness-to-cost ratio for the subset of use cases comprises:
for each use case from the subset of use cases, compute a second cost as a sum of the first costs associated with the user actions of the use case;
compute a third cost as a sum of the second costs;
for each user-interface component that is acted upon by at least one of the user actions of at least one of the use cases from the subset of use cases, compute a first goodness measure that indicates a level of user-action coverage that the subset of use cases provides on the user-interface component;

compute a second goodness measure as a sum of the first goodness measures; and compute the goodness-to-cost ratio as a ratio between the second goodness measure and the third cost.

20. The media of claim 19, wherein the subset of use cases has the highest goodness-to-cost ratio among all possible subsets of use cases selected from the set of use case.

21. The media of claim 19, wherein for each user-interface component that is acted upon by at least one of the user actions of at least one of the use cases from the subset of use cases, compute the first goodness measure comprises:

for each unique pair of use cases from the subset of use cases, compute a first distance between the pair of use cases with respect to the user-interface component, wherein the first distance indicates a difference between the user actions of the pair of use cases up to the user actions that act upon the user-interface component;

compute a second distance as a sum of the first distances; and compute the first goodness measure based on the second distance.

22. The media of claim 19, wherein select, from the set of use cases, the subset of use cases comprises:

select, from the set of use cases, all use cases that are the only use cases among the set of use cases to comprise user actions that uniquely act upon at least one of the user-interface components or to comprise at least one unique combination of user action and user-interface component;

include the selected use cases in the subset of use cases;

compute the goodness-to-cost ratio of the subset of use cases based on the use cases currently included in the subset of use cases;

iteratively select, from one or more remaining use cases from the set of use cases, a use case that maximally increases the goodness-to-cost ratio of the subset of use cases and include the selected use case in the subset of use cases, until including additional use cases in the subset of use cases no longer increases the goodness-to-cost ratio of the subset of use cases.

23. The media of claim 19, wherein select, from the set of use cases, the subset of use cases comprises iterate among all possible subsets of the set of use cases using a branch-and-bound algorithm to locate the one subset of use cases that has the highest goodness-to-cost ratio.

24. The media of claim 19, wherein the software is further operable when executed by the one or more computing devices to train a user-interface-component-mapping tool using the subset of use cases, wherein the user-interface-component-mapping tool automatically maps a second user-interface component of a second user-interactive software application to a portion of source code of the second software application.

25. The media of claim 19, wherein the software is further operable when executed by the one or more computing devices to extract the set of use cases from a set of test cases of the software application.

26. The media of claim 19, wherein the level of user-action coverage is based on whether the user-interface component is exercised by the subset of use-cases.

27. The media of claim 19, wherein selecting the subset of use cases comprises selecting a plurality of use cases that maximizes a number of user-interface components exercised by at least one action when the subset of uses cases is performed.

28. A system comprising:

means for accessing a set of use cases of a software application;

means for selecting, from the set of use cases, a subset of use cases that has a goodness-to-cost ratio that satisfies a predetermined requirement, wherein computing the goodness-to-cost ratio for the subset of use cases comprises:

for each use case from the subset of use cases, means for computing a second cost as a sum of the first costs associated with the user actions of the use case;

means for computing a third cost as a sum of the second costs;

for each user-interface component that is acted upon by at least one of the user actions of at least one of the use cases from the subset of use cases, means for computing a first goodness measure that indicates a level of user-action coverage that the subset of use cases provides on the user-interface component;

means for computing a second goodness measure as a sum of the first goodness measures; and means for computing the goodness-to-cost ratio as a ratio between the second goodness measure and the third cost.

29. The system of claim 28, wherein the means for computing the first goodness measure comprises means for determining whether the user interface-component is exercised by the subset of use-cases.

30. The system of claim 28, wherein the means for selecting the subset of use cases comprises means for selecting a plurality of use cases that maximizes a number of user-interface components exercised by at least one action when the subset of uses cases is performed.

* * * * *